(12) United States Patent
Hwang et al.

(10) Patent No.: US 12,534,366 B2
(45) Date of Patent: Jan. 27, 2026

(54) METHOD FOR PREPARING SYNTHESIS GAS

(71) Applicant: LG CHEM, LTD., Seoul (KR)

(72) Inventors: Sung June Hwang, Daejeon (KR); Tae Woo Kim, Daejeon (KR); Sik Ki, Daejeon (KR); Sung Kyu Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 756 days.

(21) Appl. No.: 17/794,545

(22) PCT Filed: Dec. 6, 2021

(86) PCT No.: PCT/KR2021/018397
§ 371 (c)(1),
(2) Date: Jul. 21, 2022

(87) PCT Pub. No.: WO2022/164006
PCT Pub. Date: Aug. 4, 2022

(65) Prior Publication Data
US 2023/0264952 A1    Aug. 24, 2023

(30) Foreign Application Priority Data

Jan. 29, 2021 (KR) .................. 10-2021-0013204

(51) Int. Cl.
*C01B 3/36* (2006.01)
*C10G 7/00* (2006.01)
*C10G 9/02* (2006.01)

(52) U.S. Cl.
CPC .................. *C01B 3/36* (2013.01); *C10G 7/00* (2013.01); *C10G 9/02* (2013.01);
(Continued)

(58) Field of Classification Search
CPC ................ C01B 3/36; C01B 2203/062; C01B 2203/063; C01B 2203/0833;
(Continued)

(56) References Cited

U.S. PATENT DOCUMENTS

| 3,862,899 A | 1/1975 | Murphy et al. |
| 4,938,862 A | 7/1990 | Visser et al. |

(Continued)

FOREIGN PATENT DOCUMENTS

| CN | 1842584 A | 10/2006 |
| CN | 103911180 A | 7/2014 |

(Continued)

OTHER PUBLICATIONS

Plastics to Energy by Roy (Year: 2019).*

*Primary Examiner* — Coris Fung
(74) *Attorney, Agent, or Firm* — Bryan Cave Leighton Paisner LLP (57) ABSTRACT

Provided is a method for preparing synthesis gas, and more particularly, a method for preparing synthesis gas including: mixing a pyrolysis fuel oil (PFO) stream including a PFO and a pyrolysis gas oil (PGO) stream including a PGO discharged from a naphtha cracking center (NCC) process to produce a mixed oil stream (S10); and supplying the mixed oil stream to a combustion chamber for a gasification process to obtain synthesis gas (S20), wherein a ratio of a flow rate of the PGO stream in the mixed oil stream to a flow rate of the mixed oil stream is 0.01 to 0.3.

15 Claims, 3 Drawing Sheets

(52) U.S. Cl.
CPC .. *C01B 2203/062* (2013.01); *C01B 2203/063* (2013.01); *C01B 2203/0833* (2013.01); *C01B 2203/1235* (2013.01); *C01B 2203/1276* (2013.01); *C01B 2203/1614* (2013.01); *C10G 2300/1044* (2013.01); *C10G 2300/1059* (2013.01); *C10G 2300/302* (2013.01)

(58) Field of Classification Search
CPC .... C01B 2203/1235; C01B 2203/1276; C01B 2203/1614; C01B 3/32; C01B 3/34; C10G 7/00; C10G 9/02; C10G 2300/1044; C10G 2300/1059; C10G 2300/302; C10G 9/00
See application file for complete search history.

(56) References Cited

U.S. PATENT DOCUMENTS

| | | | |
|---|---|---|---|
| 6,149,859 A | 11/2000 | Jahnke et al. | |
| 10,689,587 B2 * | 6/2020 | Al-Sayed | C10G 9/36 |
| 2009/0159494 A1 | 6/2009 | Gautam et al. | |
| 2010/0294994 A1 | 11/2010 | Basini et al. | |
| 2018/0312767 A1 | 11/2018 | Al-Sayed et al. | |
| 2019/0203130 A1 * | 7/2019 | Mukherjee | C10G 69/14 |
| 2019/0292467 A1 * | 9/2019 | England | C10F 5/06 |

FOREIGN PATENT DOCUMENTS

| | | | | |
|---|---|---|---|---|
| CN | 111836875 A | 10/2020 | | |
| EP | 0916739 A2 | 5/1999 | | |
| JP | 01-252696 A | 10/1989 | | |
| JP | 2008-50303 A | 3/2008 | | |
| JP | 2020-517797 A | 6/2020 | | |
| KR | 10-2009-0002996 A | 1/2009 | | |
| KR | 10-2010-0096800 A | 9/2010 | | |
| KR | 10-1123384 B1 | 2/2012 | | |
| KR | 10-1123385 B1 | 2/2012 | | |
| KR | 10-2014-0104043 A | 8/2014 | | |
| KR | 10-2020-0055472 A | 5/2020 | | |
| KR | 10-2020-0091497 A | 7/2020 | | |
| WO | WO-2018111577 A1 * | 6/2018 | ............. | C10G 1/002 |
| WO | WO-2020242921 A1 * | 12/2020 | ............. | C07C 4/04 |

* cited by examiner

METHOD FOR PREPARING SYNTHESIS GAS

TECHNICAL FIELD

Cross-Reference to Related Applications

The present application is a National Phase entry pursuant to 35 U.S.C. § 371 of International Application No. PCT/KR2021/018397, filed on Dec. 6, 2021, and claims the benefit of and priority to Korean Patent Application No. 10-2021-0013204, filed on Jan. 29, 2021, the entire contents of which are incorporated by reference in their entirety for all purposes as if fully set forth herein.

TECHNICAL FIELD

The present invention relates to a method for preparing synthesis gas, and more particularly, to a method for preparing synthesis gas which allows pyrolyzed fuel oil (PFO) in a naphtha cracking center (NCC) process to be used as a raw material of a gasification process.

BACKGROUND ART

Synthesis gas (syngas) is an artificially prepared gas, unlike natural gas such as spontaneous gas, methane gas, and ethane gas, which is released from land in oil fields and coal mine areas, and is prepared by a gasification process.

The gasification process is a process of converting a hydrocarbon such as coal, petroleum, and biomass as a raw material into synthesis gas mainly composed of hydrogen and carbon monoxide by pyrolysis or a chemical reaction with a gasifying agent such as oxygen, air, and water vapor. A gasifying agent and a raw material are supplied to a combustion chamber positioned at the foremost end of the gasification process to produce synthesis gas by a combustion process at a temperature of 700° C. or higher, and as a kinematic viscosity of the raw material supplied to the combustion chamber is higher, a differential pressure in the combustion chamber is increased or atomization is not performed well, so that combustion performance is deteriorated or a risk of explosion is increased due to excessive oxygen.

Conventionally, as a raw material of a gasification process for preparing synthesis gas using a liquid phase hydrocarbon raw material, refinery residues, such as vacuum residues (VR) and bunker-C oil, discharged from refinery where crude oil is refined were mainly used. However, since the refinery residue has a high kinematic viscosity, a pretreatment such as a heat treatment, a diluent, or water addition is required to be used as the raw material of the gasification process, and since the refinery residue has high contents of sulfur and nitrogen, production of acidic gas such as hydrogen sulfide and ammonia is increased during the gasification process, and thus, in order to respond to tightened environmental regulations, a need to replace the refinery residue with raw materials having low contents of sulfur and nitrogen is raised.

Meanwhile, a pyrolysis fuel oil (PFO) which is a by-product discharged from a naphtha cracking center (NCC) process which is a process of preparing petrochemical basic materials such as propylene is generally used as a fuel, but since the sulfur content is a high level for using the oil as a fuel without a pretreatment, the market is getting smaller due to the environmental regulations and a situation where sales are impossible in the future should be prepared.

Accordingly, the present inventors completed the present invention based on the idea that when the pyrolysis fuel oil (PFO) of the naphtha cracking center (NCC) process is used as the raw material of the gasification process, greenhouse gas emissions may be reduced, operating costs of the gasification process may be reduced, and process efficiency may be improved, as compared with the case of using the conventional refinery residue as a raw material.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

An object of the present invention is to provide a method for preparing synthesis gas which may reduce greenhouse gas emissions, reduce operating costs of a gasification process, and improve process efficiency, as compared with the case of a conventional refinery residue as a raw material, by using the pyrolysis fuel oil (PFO) of a naphtha cracking center (NCC) process as the raw material of the gasification process.

Technical Solution

In one general aspect, a method for preparing synthesis gas includes: mixing a pyrolysis fuel oil (PFO) stream including a PFO and a pyrolysis gas oil (PGO) stream including a PGO discharged from a naphtha cracking center (NCC) process to produce a mixed oil stream (S10); and supplying the mixed oil stream to a combustion chamber for a gasification process to obtain synthesis gas (S20), wherein a ratio of a flow rate of the PGO stream in the mixed oil stream to a flow rate of the mixed oil stream is 0.01 to 0.3.

Advantageous Effects

According to the present invention, by using a pyrolysis fuel oil (PFO) of the naphtha cracking center (NCC) process as a raw material of a gasification process, greenhouse gas emissions may be reduced, operating costs of the gasification process may be reduced, and process efficiency may be improved, as compared with the case of using a conventional refinery residue as a raw material.

DETAILED DESCRIPTION

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

The term "stream" in the present invention may refer to a fluid flow in a process, or may refer to a fluid itself flowing in a pipe. Specifically, the "stream" may refer to both a fluid itself flowing in a pipe connecting each device and a fluid flow. In addition, the fluid may refer to a gas or liquid, and a case in which a solid substance is included in the fluid is not excluded.

In the present invention, the term "C#" in which "#" is a positive integer represents all hydrocarbons having # carbon atoms. Therefore, the term "C4" represents a hydrocarbon compound having 4 carbon atoms. In addition, the term "C#+" represents all hydrocarbon molecules having # or more carbon atoms. Therefore, the term "C4+" represents a mixture of hydrocarbons having 4 or more carbon atoms.

Hereinafter, the present invention will be described in more detail with reference to the FIG. 1 for better understanding of the present invention.

According to the present invention, a method for preparing synthesis gas (syngas) is provided. The method for preparing synthesis gas includes: mixing a PFO stream including a pyrolysis fuel oil (PFO) and a PGO stream including a pyrolysis gas oil (PGO) discharged from a naphtha cracking center process (S1) to produce a mixed oil stream (S10); and supplying the mixed oil stream to a combustion chamber for a gasification process (S3) (S20), wherein a ratio of a flow rate of the PGO stream in the mixed oil stream relative to a flow rate of the mixed oil stream is 0.01 to 0.3. Herein, the "flow rate" may refer to a flow of a weight per unit hour. As a specific example, the unit of the flow rate may be kg/h.

The synthesis gas is an artificially prepared gas, unlike natural gas such as spontaneous gas, methane gas, and ethane gas, which is released from land in oil fields and coal mine areas, and is prepared by a gasification process.

The gasification process is a process of converting a hydrocarbon such as coal, petroleum, and biomass as a raw material into synthesis gas mainly composed of hydrogen and carbon monoxide by pyrolysis or a chemical reaction with a gasifying agent such as oxygen, air, and water vapor. A gasifying agent and a raw material are supplied to a combustion chamber positioned at the foremost end of the gasification process to produce synthesis gas by a combustion process at a temperature of 700° C. or higher, and as a kinematic viscosity of the raw material supplied to the combustion chamber is higher, a differential pressure in the combustion chamber is increased or atomization is not performed well, so that combustion performance is deteriorated or a risk of explosion is increased due to excessive oxygen.

Conventionally, as a raw material of a gasification process for preparing synthesis gas using a liquid phase hydrocarbon raw material, refinery residues, such as vacuum residues (VR) and bunker-C oil, discharged from refinery where crude oil is refined were mainly used. However, since the refinery residue has a high kinematic viscosity, a pretreatment such as a heat treatment, a diluent, or water addition is required to be used as the raw material of the gasification process, and since the refinery residue has high contents of sulfur and nitrogen, production of acidic gas such as hydrogen sulfide and ammonia is increased during the gasification process, and thus, in order to respond to tightened environmental regulations, a need to replace the refinery residue with raw materials having low contents of sulfur and nitrogen is raised. For example, among the refinery residues, a vacuum residue may include about 3.5 wt % of sulfur and about 3600 ppm of nitrogen, and bunker C-oil may include about 4.5 wt % of sulfur.

Meanwhile, a pyrolysis fuel oil (PFO) discharged from a naphtha cracking center process which is a process of cracking naphtha to prepare petrochemical basic materials such as ethylene and propylene is generally used as a fuel, but since the sulfur content is a high level for using the oil as a fuel without a pretreatment, the market is getting smaller due to the environmental regulations and a situation where sales are impossible in the future should be prepared.

Therefore, in the present invention, it is intended that greenhouse gas emissions are reduced, operating costs of a gasification process are reduced, and process efficiency is improved, as compared with a case of using a conventional refinery residue as a raw material, by mixing a PFO stream including a pyrolysis fuel oil (PFO) discharged from a naphtha cracking center process and a PGO stream including a pyrolysis gas oil (PGO) discharged from a naphtha cracking center process at a specific ratio to produce a mixed oil stream and then using the mixed oil stream as the raw material of the gasification process.

According to an exemplary embodiment of the present invention, the PFO stream including a pyrolysis fuel oil (PFO) and the PGO stream including a pyrolysis gas oil (PGO) may be discharged from a naphtha cracking center process (S1).

Specifically, the naphtha cracking center process is a process of cracking naphtha including paraffin, naphthene, and aromatics to prepare olefins such as ethylene and propylene used as a basic material for petrochemicals, and may be largely composed of a cracking process, a quenching process, a compression process, and a refining process.

The cracking process is a process of cracking naphtha into hydrocarbons having fewer carbons in a cracking furnace at 800° C. or higher, and may discharge cracked gas at a high temperature. Here, the naphtha may undergo a preheating process from high pressure water vapor before entering the cracking furnace, and then may be supplied to the cracking furnace.

The quenching process is a process of cooling the cracked gas at a high temperature, for suppressing a polymerization reaction of a hydrocarbon in cracked gas at a high temperature discharged from the cracking furnace, and recovering waste heat and decreasing a heat load in a subsequent process (compression process). Here, the quenching process may include primary cooling of the cracked gas at a high temperature with quench oil and secondary cooling with quench water.

Specifically, after the primary cooling and before the secondary cooling, the primarily cooled cracked gas may be supplied to a gasoline fractionator to separate light oils including hydrogen, methane, ethylene, propylene, and the like, pyrolysis gasoline (PG), the pyrolysis fuel oil (PFO), and the pyrolysis gas oil (PGO) therefrom. Thereafter, the light oil may be transported to a subsequent compression process.

The compression process may be a process of producing compressed gas having a reduced volume by elevating pressure of the light oil under high pressure for economically separating and refining the light oil.

The refining process is a process of cooling the compressed gas which is compressed with high pressure to a cryogenic temperature and then separating the components in stages by a boiling point difference, and may produce hydrogen, ethylene, propylene, propane, C4 oils, pyrolysis gasoline (PG), and the like.

As described above, from the quenching process of the naphtha cracking center process (S1), a pyrolysis fuel oil (PFO) and a pyrolysis gas oil (PGO) may be discharged. In general, the pyrolysis fuel oil (PFO) includes about 0.1 wt % of less of sulfur and about 20 ppm or less of nitrogen, and when it is used as a fuel, sulfur oxides (Sox) and nitrogen oxides (NOx) are discharged during a combustion process, and thus, environmental issues may be raised.

Accordingly, in the present invention, the above problems may be solved by using a mixed oil stream in which the pyrolysis fuel oil (PFO) and the pyrolysis gas oil (PGO) are mixed at a specific ratio as the raw material of the gasification process, and furthermore, greenhouse gas emissions may be reduced, operating costs of the gasification process may be reduced, and process efficiency may be improved, as compared with a case of using a conventional refinery residue as the raw material of the gasification process.

According to an exemplary embodiment of the present invention, as described above, the PFO stream and the PGO stream of the present invention may include the pyrolysis fuel oil (PFO) and the pyrolysis gas oil (PGO) discharged from the gasoline fractionator 10 of the naphtha cracking center process (S1), respectively. As a specific example, in the total number of stages of the gasoline fractionator 10 shown in FIG. 1, when a top stage is expressed as a stage at 1% and a bottom stage is expressed as a stage at 100%, the pyrolysis fuel oil (PFO) may be discharged from a stage at 90% or more, 95% or more, or 95% to 100%, and the pyrolysis gas oil (PGO) may be discharged from a stage at 10% to 70%, 15% to 65%, or 20% to 60%, relative to the total number of stages of the gasoline fractionator 10. For example, when the total number of stages s of the gasoline fractionator 10 is 100, a top stage may be a first stage and a bottom stage may be a 100th stage, and a stage at 90% or more of the total number of stages of the gasoline fractionator 10 may refer to a 90th stage to a 100th stage of the gasoline fractionator 10.

Figure 1:
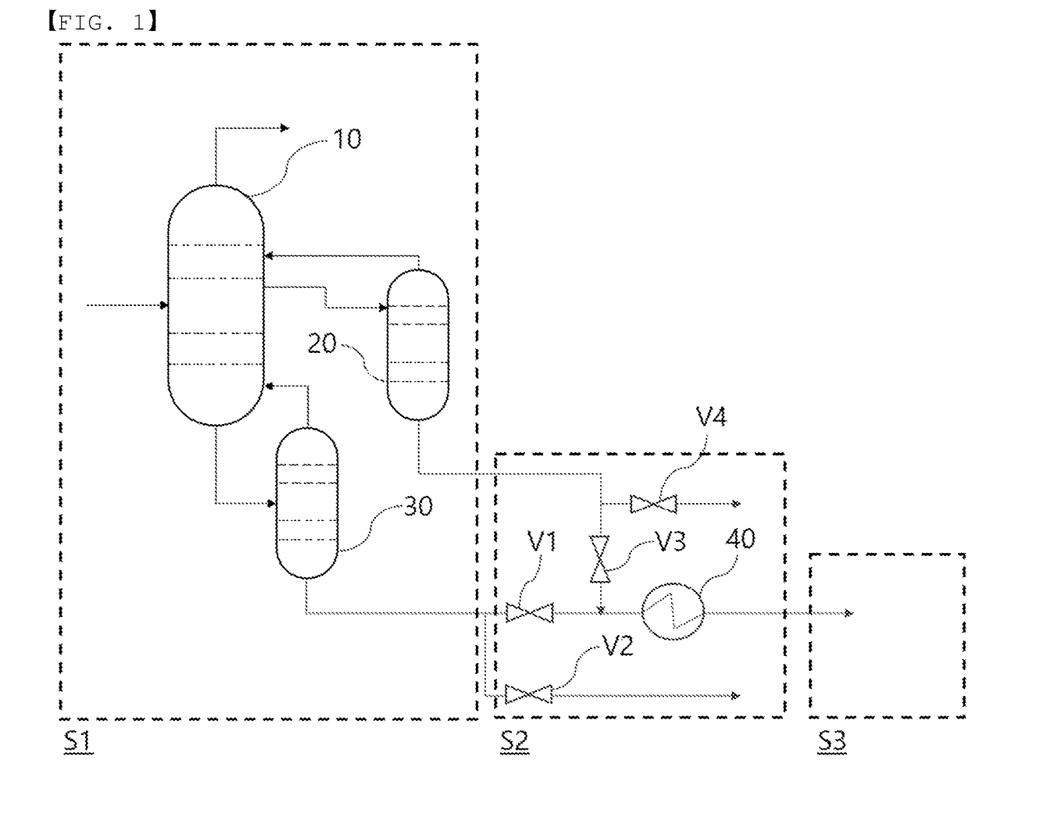
FIG. 1 is a process flow diagram for a method for preparing synthesis gas according to an exemplary embodiment of the present invention.

According to an exemplary embodiment of the present invention, as shown in FIG. 1, the PGO stream is discharged from a side portion of the gasoline fractionator 10 of the naphtha cracking center process (S1) and may be a lower discharge stream which is discharged from a lower portion of a first stripper 20 after supplying a side discharge stream including the pyrolysis gas oil (PGO) to the first stripper 20, and the PFO stream is discharged from a lower portion of the gasoline fractionator 10 of the naphtha cracking center process (S1) and may be a lower discharge stream which is discharged from a lower portion of a second stripper 30 after supplying a lower discharge stream including the pyrolysis fuel oil (PFO) to the second stripper 30.

The first stripper 20 and the second stripper 30 may be a device in which a stripping process of separating and removing gas or vapor dissolved in a liquid is performed, and for example, may be performed by a method such as direct contact, heating, and pressing by, for example, steam, inert gas, or the like. As a specific example, the side discharge stream from the gasoline fractionator 10 is supplied to the first stripper 20, thereby refluxing an upper discharge stream from the first stripper 20 including a light fraction separated from the side discharge stream from the gasoline fractionator 10 to the gasoline fractionator 10. In addition, the lower discharge stream from the gasoline fractionator 10 is supplied to the second stripper 30, thereby refluxing an upper discharge stream from the second stripper 30 including a light fraction separated from the lower discharge stream from the gasoline fractionator 10 to the gasoline fractionator 10.

According to an exemplary embodiment of the present invention, the PGO stream may include 70 wt % or more or 70 wt % to 95 wt % of C10 to C12 hydrocarbons, and the PFO stream may include 70 wt % or more or 70 wt % to 98 wt % of C13+ hydrocarbons. For example, the PGO stream including 70 wt % or more of C10 to C12 hydrocarbons may have a kinematic viscosity at 40° C. of 1 to 200 cSt and a flash point of 10 to 50° C. In addition, for example, the PFO stream including 70 wt % or more of C13+ hydrocarbons may have a kinematic viscosity at 40° C. of 400 to 100,000 cSt and a flash point of 70 to 200° C. As such, the PFO stream including more heavy hydrocarbons than the PGO stream may have a higher kinematic viscosity and a higher flash point than the pyrolysis gas oil under the same temperature conditions.

According to an exemplary embodiment of the present invention, the PGO stream may have a boiling point of 200 to 288° C. or 210 to 270° C., and the PFO stream may have a boiling point of 289 to 550° C. or 300 to 500° C.

The boiling points of the PGO stream and the PFO stream may refer to the boiling points of the PGO stream and the PFO stream in a bulk form, each composed of a plurality of hydrocarbons. Here, the kind of hydrocarbons included in the PGO stream and the kind of hydrocarbons included in the PFO stream may be different from each other, and some kinds may be the same. As a specific example, the kind of hydrocarbons included in the PGO stream and the PFO stream may be included as described above.

According to an exemplary embodiment of the present invention, in step (S10), the PFO stream and the PGO stream may be mixed to produce a mixed oil stream. Here, a ratio of the flow rate of the PGO stream in the mixed oil stream relative to the flow rate f the mixed oil stream (hereinafter, referred to as "flow rate ratio of PGO stream") may be 0.01 to 0.3, 0.01 to 0.2, or 0.05 to 0.2.

The process of producing the mixed oil stream having the flow rate ratio of the PGO stream in the above range may be performed by adjusting the flow rates of the PGO stream and the PFO stream, using a first flow rate adjustment device V1, a second flow rate adjustment device V2, a third flow rate adjustment device V3, and a fourth flow rate adjustment device V4 shown in the pretreatment process (S2) of FIG. 1. That is, the step (S10) may be performed by the pretreatment process (S2) of FIG. 1.

As described above, a gasifying agent and a raw material are supplied to the combustion chamber (not shown) positioned at the foremost end of the gasification process (S3) to produce synthesis gas by a combustion process at a temperature of 700° C. or higher. Here, the reaction of producing synthesis gas is performed under a high pressure of 20 to 80 atm, and the raw material in the combustion chamber should be moved at a high flow velocity of 2 to 40 m/s. Therefore, the raw material should be pumped at a high flow velocity under a high pressure for the reaction of producing synthesis gas, and when the kinematic viscosity of the raw material supplied to the combustion chamber is higher than an appropriate range, a high-priced pump should be used due to reduced pumpability or costs are increased due to increased energy consumption, and pumping to desired conditions may be impossible. In addition, since pumping is not performed well, the raw material may not be uniformly supplied to the combustion chamber. In addition, since a differential pressure in the combustion chamber is raised or uniform atomization of the material is not performed well due to its small particle size, combustion performance may be deteriorated, productivity may be lowered, a large amount of gasifying agent is required, and a risk of explosion is increased due to excessive oxygen. Here, an appropriate range of the kinematic viscosity may be somewhat different depending on the kind of synthesis gas, conditions of the combustion process performed in the combustion chamber, and the like, but generally, a lower kinematic viscosity of the raw material is better in terms of costs, productivity, and safety, at a temperature of the raw material at the time of supply to the combustion chamber in the gasification process (S3), and it is preferred that the kinematic viscosity is in a range of 300 cSt or less and within the range, a differential pressure rise in the combustion chamber is prevented within the range, and atomization is performed well to improve combustion performance.

In addition, when the flash point of the raw material supplied to the combustion chamber is lower than an appropriate range, flame may occur in a burner before combustion reaction occurrence, risk of explosion is present by a backfire phenomenon of the flame in the combustion chamber, and the refractories in the combustion chamber may be damaged. Here, an appropriate range of the flash point may be varied depending on the kind of synthesis gas to be synthesized, conditions of the combustion process performed in the combustion chamber, and the like, but generally, it is preferred that the flash point of the raw material is in a range of being higher than the temperature of the raw material at the time of supply to the combustion chamber in the gasification process (S3) by 25° C. or more, and within the range, a loss of the raw material, an explosion risk, and damage of refractories in the combustion chamber may be prevented.

Accordingly, in the present invention, in order to control the kinematic viscosity and the flash point of the mixed oil stream which is the raw material supplied to the combustion chamber in the gasification process (S3), the flow rate ratio of the PGO stream and the PFO stream in the mixed oil stream may be adjusted. That is, by adjusting the flow rate ratio of the PGO stream and the PFO stream in the mixed oil stream, the kinematic viscosity and the flash point of the mixed oil stream may be controlled to an appropriate range at a temperature of the mixed oil stream at the time of supply to the combustion chamber.

According to an exemplary embodiment of the present invention, the temperature of the mixed oil stream at the time of supply to the combustion chamber may be lower than the flash point of the mixed oil stream at the time of supply to the combustion chamber by 25° C. or more and may be a temperature at which the kinematic viscosity is 300 cSt or less. Specifically, the kinematic viscosity of the mixed oil stream at the time of supply to the combustion chamber may be 300 cSt or less or 1 cSt to 300 cSt, and the flash point of the mixed oil stream may be higher than the temperature of the mixed oil stream at the time of supply to the combustion chamber by 25° C. or more or 25° C. to 150° C. Here, the temperature of the mixed oil stream at the time of supply to the combustion chamber may be 20° C. to 90° C. or 30° C. to 80° C. The kinematic viscosity of the mixed oil stream at the temperature at the time of supply to the combustion chamber within the range may be 300 cSt or less and may be lower than the flash point of the mixed oil stream by 25° C., and thus, may satisfy the process operating conditions for using the mixed oil stream as the raw material of the gasification process (S3).

Specifically, by adjusting the ratio of the flow rate of the PGO stream in the mixed oil stream relative to the flow rate of the mixed oil stream to 0.01 to 0.3, 0.01 to 0.2, or 0.05 to 0.2, when the mixed oil stream is supplied to the combustion chamber, the flash point of the mixed oil stream may be higher than the temperature of the mixed oil stream at the time of supply by 25° C. or more and the kinematic viscosity of the mixed oil stream may be in a range of 300 cSt or less at the temperature of the mixed oil stream at the time of supply.

In general, the PFO stream and the PGO stream are the heaviest residues in the NCC process and have been used as a simple fuel, and when they are used as a simple fuel as such, it is not necessary to adjust the compositions and the physical properties thereof. However, as in the present invention, in order to use the stream as the raw material of the synthesis gas, specific physical properties, for example, both a kinematic viscosity and a flash point should be satisfied. However, the PGO stream satisfies the kinematic viscosity but has a too low flash point, and the PFO stream has a high flash point but has a too high kinematic viscosity, and thus, each stream may not satisfy both the kinematic viscosity and the flash point and it is difficult to use each of the streams as the raw material of the synthesis gas. In addition, when a mixed oil stream in which the PFO stream and the PGO stream are mixed is used as the raw material of the synthesis gas, generally a ratio of the flow rate of the PGO stream relative to the flow rate of the mixed oil stream is about 0.35 to 0.7, and in this case also, both the kinematic viscosity and the flash point may not be satisfied and it is difficult to use the stream as the raw material of the synthesis gas. In this regard, in the present invention, by controlling the ratio of the flow rate of the PGO stream relative to the flow rate of the mixed oil stream to 0.01 to 0.3, when the mixed oil stream is supplied to the combustion chamber, the flash point of the mixed oil stream may be controlled to a range higher than the temperature of the mixed oil stream at the time of supply by 25° C. or more and the kinematic viscosity may be controlled to a range of 300 cSt or less at the temperature of the mixed oil stream at the time of supply, and thus, the conditions for using the mixed oil stream as the raw material of the synthesis gas may be satisfied.

The ratio of the flow rate of the PGO stream in the mixed oil stream relative to the flow rate of the mixed oil stream may be 0.01 or more. That is, when the PFO stream is supplied alone to the combustion chamber at the temperature satisfying the kinematic viscosity of 300 cSt, the conditions in which the flash point of the PFO stream is higher than the temperature at the time of supply by 25° C. or more may not be satisfied. However, when the PFO stream is mixed with the PGO stream at the flow rate ratio range described above and supplied to the combustion chamber as the mixed oil stream, the conditions in which the flash point of the mixed oil stream is higher than the temperature at the time of supply satisfying the kinematic viscosity of 300 cSt by 25° C. or more may be satisfied. That is, within the range of the flow rate ratio of the PGO stream described above, a decrease in the kinematic viscosity is more increased than a decrease in the flash point, and thus, the flash point and the kinematic viscosity of the mixed oil stream at the time of supply of the mixed oil stream to the combustion chamber may be controlled to the ranges of the flash point and the kinematic viscosity described above.

Meanwhile, when the ratio of the flow rate of the PGO stream in the mixed oil stream relative to the flow rate of the mixed oil stream is 0.3 or less, the conditions in which the flash point of the mixed oil stream is higher than the temperature at the time of supply satisfying the kinematic viscosity of 300 cst by 25° C. or more may be satisfied. That is, within the range of the flow rate ratio of the PGO stream described above, the flash point and the kinematic viscosity of the mixed oil stream at the time of supply to the combustion chamber may be controlled to the ranges of the flash point and the kinematic viscosity described above. However, for example, when the flow rate ratio of the PGO stream is more than 0.3, a decrease in the flash point is more increased than a decrease in the kinematic viscosity, and thus, a temperature difference between the flash point of the mixed oil stream and the temperature at the time of supply satisfying the kinematic viscosity of 300 cSt is less than 25° C. and the supply conditions to the combustion chamber may not be satisfied.

As such, by adjusting the flow rate ratio of the PGO stream and the PFO stream in the mixed oil stream, the flash point and the kinematic viscosity of the mixed oil stream at the time of supply to the combustion chamber may be controlled, and thus, the mixed oil stream may have the physical properties appropriate for use as the raw material of the gasification process (S3).

Figure 2:
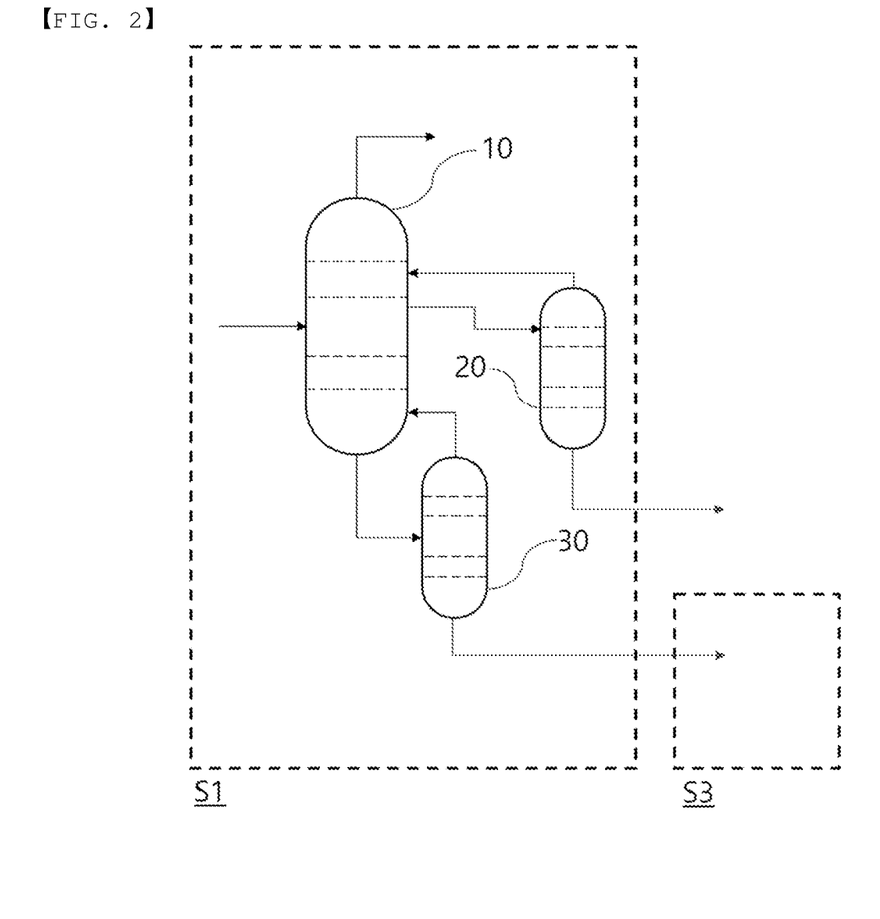
FIG. 2 is a process flow diagram for methods for preparing synthesis gas according to Comparative Examples 1 and 5 of the present invention.
Figure 3:
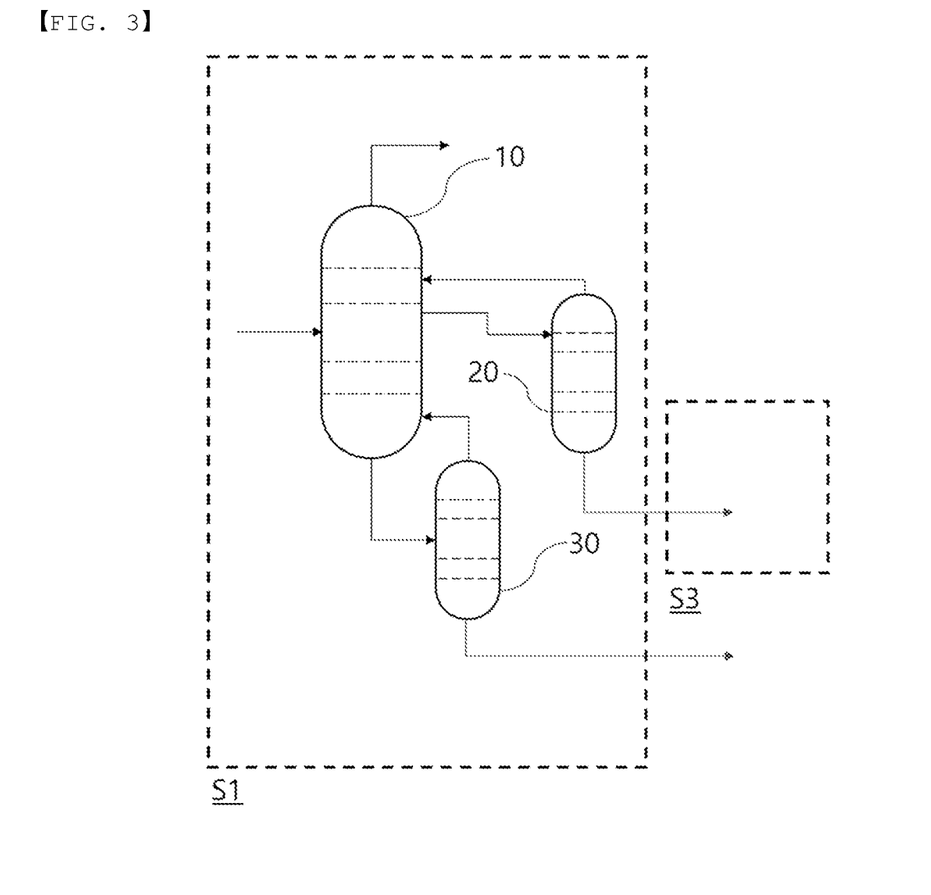
FIG. 3 is a process flow diagram for methods for preparing synthesis gas according to Comparative Examples 4 and 8 of the present invention.

Meanwhile, for example, when the PFO stream is directly supplied to the combustion chamber without the pretreatment process (S2) as shown in FIG. 2, the PGO stream is directly supplied to the combustion chamber without the pretreatment process (S2) as shown in FIG. 3, or the PGO stream and the PFO stream are mixed but supplied to the combustion chamber at a flow rate ratio of the PGO stream out of the appropriate range of the present invention (0.01 to 0.3), a temperature satisfying both the kinematic viscosity and the flash point in the appropriate range described above may not exist. As such, when the mixed oil stream is supplied to the combustion chamber at the temperature which does not satisfy any one of the kinematic viscosity and the flash point in the appropriate ranges, a differential pressure in the combustion chamber is raised or atomization is not performed well to deteriorate combustion performance, and an explosion risk is increased due to excessive oxygen, or flame may occur in the burner before a combustion reaction occurs, and an explosion risk is present by a backfire phenomenon of flame in the combustion chamber and refractories in the combustion chamber may be damaged.

According to an exemplary embodiment of the present invention, the mixed oil stream may pass through a heat exchanger 40 before being supplied to the combustion chamber for the gasification process (S3) to adjust the temperature to the temperature at the time of supply and then may be supplied to the combustion chamber. The mixed oil stream is produced by mixing the PGO stream at a high temperature discharged from the first stripper or the second stripper and the PFO stream, and may control the temperature to the temperature at the time of supply as the raw material of the synthesis gas and also reduce process energy, by reusing the sensible heat of the mixed oil stream which may be wasted as waste heat in the process using the heat exchanger 40.

According to an exemplary embodiment of the present invention, burning the mixed oil stream supplied to the combustion chamber in the gasification process (S3) at a temperature of 700° C. or higher, 700 to 2000° C., or 800 to 1800° C. (S30) may be further included. In addition, in step (S20), the mixed oil stream may be supplied to the combustion chamber together with the gasifying agent. Here, the gasifying agent may include one or more selected from the group consisting of oxygen, air, and water vapor, and as a specific example, the gasifying agent may be oxygen or water vapor.

As such, by burning the mixed oil stream at a high temperature in the presence of the gasifying agent, the synthesis gas may be prepared. The synthesis gas prepared according to the preparation method of the present invention includes carbon monoxide and hydrogen and may further include one or more selected from the group consisting of carbon dioxide, ammonia, hydrogen sulfide, hydrogen cyanide, and carbonyl sulfide.

According to an exemplary embodiment of the present invention, in the method for preparing synthesis gas, if necessary, devices such as a valve, a pump, a separator, and a mixer may be further installed.

Hereinabove, the method for preparing synthesis gas according to the present invention has been described and illustrated in the drawings, but the description and the illustration in the drawings are the description and the illustration of only core constitutions for understanding of the present invention, and in addition to the process and devices described above and illustrated in the drawings, the process and the devices which are not described and illustrated separately may be appropriately applied and used for carrying out the method for preparing synthesis gas according to the present invention.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Examples 1 to 6

According to the process flow diagram shown in FIG. 1, synthesis gas was prepared.

Specifically, a side discharge stream discharged from a side portion of the gasoline fractionator 10 of a naphtha cracking center process (S1) was supplied to a first stripper 20, a PGO stream including a pyrolysis gas oil (PGO) was discharged from a lower portion of the first stripper 20, the lower discharge stream discharged from a lower portion of the gasoline fractionator 10 was supplied to a second stripper 30, and then a PFO stream including a pyrolysis fuel oil (PFO) was discharge from a lower portion of the second stripper 30. Next, the flow rate ratio of the PGO stream and the PFO stream were adjusted and mixed by a pretreatment process (S2), thereby producing a mixed oil stream. Next, the mixed oil stream was supplied to a combustion chamber in a gasification process (S3) with oxygen and vapor to prepare synthesis gas including hydrogen and carbon monoxide.

At this time, in the gasoline fractionator 10 in Examples 1 to 3, a side discharge stream discharged from a stage at 40% relative to the total number of stages of the gasoline fractionator 10 was supplied to the first stripper 20, the PGO stream including a pyrolysis gas oil (PGO) was discharged from the lower portion of the first stripper 20, and it was confirmed that the content of C10 to C12 in the PGO stream was 92 wt %. In addition, the lower discharge stream discharged from a stage at 100% relative to the total number of stages of the gasoline fractionator 10 was supplied to the second stripper 30, the PFO stream including a pyrolysis fuel oil (PFO) was discharged from the lower portion of the second stripper 30, and it was confirmed that the content of C13+ in the PFO stream was 91 wt %.

In addition, in the gasoline fractionator 10 in Examples 4 to 6, a side discharge stream discharged from a stage at 40% relative to the total number of stages of the gasoline fractionator 10 was supplied to the first stripper 20, the PGO stream including a pyrolysis gas oil (PGO) was discharged from a lower portion of the first stripper 20, and it was confirmed that the content of C10 to C12 in the PGO stream was 90 wt %. In addition, the lower discharge stream discharged from a stage at 100% relative to the total number of stages of the gasoline fractionator 10 was stripper 30, the PFO stream supplied to the second including a pyrolysis fuel oil (PFO) was discharged from the lower portion of the second stripper 30, and it was confirmed that the content of C13+ in the PFO stream was 96 wt %.

The flash point and the kinematic viscosity at 40° C. of each of the PGO stream and the PFO stream, the ratio of the flow rate of the PGO stream in the mixed oil stream relative to the flow rate of the mixed oil stream, the temperature of the mixed oil stream at the time of supply to the combustion chamber, and the flash point of the mixed oil stream were measured and are shown in the following Table 1. In addition, it was confirmed whether the process operating standards were satisfied according to the measurement results. At this time, the time when the mixed oil stream was supplied to the combustion chamber was set to temperature conditions to control the kinematic viscosity to 300 cSt.

The kinematic viscosity and the flash point were measured as follows, and were applied to all of the examples and the comparative examples.

(1) Kinematic viscosity: A sample was obtained from the stream of the sample to be measured and measurement was performed based on ASTM D7042 using SVM 3001 available from Anton Paar. In addition, the temperature of each of the samples was maintained at a temperature lower than a kinematic viscosity measurement temperature by 10° C., and the sample was stored in a closed container for preventing vaporization of light materials to minimize occurrence of a gas phase.

(2) Flash point: A sample was obtained from the stream of the sample to be measured and measurement was performed based on ASTM D93 using apm-8 available from TANAKA. In addition, the temperature of each of the samples was maintained at a temperature lower than an expected flash point by 10° C., and the sample was stored in a closed container for preventing vaporization of light materials to minimize occurrence of a gas phase.

Comparative Examples 1 to 8

The process was performed in the same manner as in Example 1, except that the ratio of the flow rate of the PGO stream in the mixed oil stream relative to the flow rate of the mixed oil stream was set to be out of the appropriate range of the present invention (0.01 to 0.3).

Specifically, in Comparative Examples 1 and 5, the synthesis gas was prepared according to the process flow diagram shown in FIG. 2. More specifically, the lower discharge stream discharged from the lower portion of the gasoline fractionator 10 of the naphtha cracking center process (S1) was supplied to the second stripper 30, and then the PFO stream including a pyrolysis fuel oil (PFO) was discharged from the lower portion of the second stripper 30. Next, the PFO stream was supplied to the combustion chamber in the gasification process (S3) together with oxygen and vapor.

In addition, in Comparative Examples 4 and 8, the synthesis gas was prepared according to the process flow diagram shown in FIG. 3. More specifically, the side discharge stream discharged from the side portion of the gasoline fractionator 10 of the naphtha cracking center process (S1) was supplied to the first stripper 20, and then the PGO stream including a pyrolysis gas oil (PGO) was discharged from the lower portion of the first stripper 20. Next, the PGO stream was supplied to the combustion chamber in the gasification process (S3) together with oxygen and vapor.

At this time, in the gasoline fractionator 10 in Comparative Examples 1 to 4, a side discharge stream discharged from a stage at 40% relative to the total number of stages of the gasoline fractionator 10 was supplied to the first stripper 20, the PGO stream including a pyrolysis gas oil (PGO) was discharged from the lower portion of the first stripper 20, and it was confirmed that the content of C10 to C12 in the PGO stream was 92 wt %. In addition, the lower discharge stream discharged from a stage at 100% relative to the total number of stages of the gasoline fractionator 10 was supplied to the second stripper 30, the PFO stream including a pyrolysis fuel oil (PFO) was discharged from the lower portion of the second stripper 30, and it was confirmed that the content of C13+ in the PFO stream was 91 wt %.

In addition, in the gasoline fractionator 10 in Comparative Example 5 to 8, a side discharge stream discharged from a stage at 40% relative to the total number of stages of the gasoline fractionator 10 was supplied to the first stripper 20, the PGO stream including a pyrolysis gas oil (PGO) was discharged from a lower portion of the first stripper 20, and it was confirmed that the content of C10 to C12 in the PGO stream was 90 wt %. In addition, the lower discharge stream discharged from a stage at 100% relative to the total number of stages of the gasoline fractionator 10 was supplied to the second stripper 30, the PFO stream including a pyrolysis fuel oil (PFO) was discharged from the lower portion of the second stripper 30, and it was confirmed that the content of C13+ in the PFO stream was 96 wt %.

The flash point and the kinematic viscosity at 40° C. of each of the PGO stream and the PFO stream, the ratio of the flow rate of the PGO stream in the mixed oil stream relative to the flow rate of the mixed oil stream, the temperature of the mixed oil stream at the time of supply to the combustion chamber, and the flash point of the mixed oil stream were measured and are shown in the following Table 2. In addition, it was confirmed whether the process operating standards were satisfied according to the measurement results. At this time, the time when the mixed oil stream was supplied to the combustion chamber was set to temperature conditions to control the kinematic viscosity to 300 cSt.

TABLE 1

| | | Kinematic viscosity (cSt@ 40° C.) | Flash point (° C.) | Flow rate ratio of PGO stream | Temperature at the time of supply of mixed oil stream (° C.) | Kinematic viscosity (cSt) at the time of supply of mixed oil stream | Flash point of mixed oil stream (° C.) | Whether process operating standards were satisfied |
|---|---|---|---|---|---|---|---|---|
| Example 1 | PGO | 145 | 30.5 | 0.01 | 58.5 | 300 | 84 | ○ |
|  | PFO | 675 | 85 | | | | | |
| Example 2 | PGO | 145 | 30.5 | 0.2 | 46.3 | 300 | 73.5 | ○ |
|  | PFO | 675 | 85 | | | | | |
| Example 3 | PGO | 145 | 30.5 | 0.3 | 40.2 | 300 | 65.5 | ○ |
|  | PFO | 675 | 85 | | | | | |
| Example 4 | PGO | 125 | 20.5 | 0.01 | 74.3 | 300 | 99.5 | ○ |
|  | PFO | 1550 | 100.5 | | | | | |
| Example 5 | PGO | 125 | 20.5 | 0.2 | 52 | 300 | 80 | ○ |
|  | PFO | 1550 | 100.5 | | | | | |
| Example 6 | PGO | 125 | 20.5 | 0.3 | 43.4 | 300 | 69 | ○ |
|  | PFO | 1550 | 100.5 | | | | | |

TABLE 2

| | | Kinematic viscosity (cSt@ 40° C.) | Flash point (° C.) | Flow rate ratio of PGO stream | Temperature at the time of supply of mixed oil stream (° C.) | Kinematic viscosity (cSt) at the time of supply of mixed oil stream | Flash point of mixed oil stream (° C.) | Whether process operating standards were satisfied |
|---|---|---|---|---|---|---|---|---|
| Comparative Example 1 | PGO | 145 | 30.5 | 0 | 62.2 | 300 | 85 | X |
|  | PFO | 675 | 85 | | | | | |
| Comparative Example 2 | PGO | 145 | 30.5 | 0.005 | 60.4 | 300 | 84.5 | X |
|  | PFO | 675 | 85 | | | | | |
| Comparative Example 3 | PGO | 145 | 30.5 | 0.4 | 35.8 | 300 | 59.5 | X |
|  | PFO | 675 | 85 | | | | | |
| Comparative Example 4 | PGO | 145 | 30.5 | 1 | 17.4 | 300 | 30.5 | X |
|  | PFO | 675 | 85 | | | | | |
| Comparative Example 5 | PGO | 125 | 20.5 | 0 | 78.4 | 300 | 100.5 | X |
|  | PFO | 1550 | 100.5 | | | | | |
| Comparative Example 6 | PGO | 125 | 20.5 | 0.005 | 76 | 300 | 100 | X |
|  | PFO | 1550 | 100.5 | | | | | |
| Comparative Example 7 | PGO | 125 | 20.5 | 0.4 | 37.2 | 300 | 60.5 | X |
|  | PFO | 1550 | 100.5 | | | | | |
| Comparative Example 8 | PGO | 125 | 20.5 | 1 | 13 | 300 | 20.5 | X |
|  | PFO | 1550 | 100.5 | | | | | |

Referring to Tables 1 and 2, in Examples 1 to 6 in which the PGO stream and PFO stream were mixed at a flow rate ratio in an appropriate range to produce the mixed oil stream according to the method for preparing synthesis gas of the present invention, when the mixed oil stream was supplied to the combustion chamber, the flash point of the mixed oil stream was higher than the temperature of the mixed oil stream at the time of supply by 25° C. or more, and the kinematic viscosity of the mixed oil stream was in a range of 300 cSt or less at a temperature of the mixed oil stream at the time of supply. By having the flash point and the kinematic viscosity range as such, the process operating conditions for use as the raw material of the gasification process (S3) were satisfied.

However, as shown in FIG. 2, when the PFO stream was directly supplied to the combustion chamber without the pretreatment process (S2) (Comparative Examples 1 and 5) or as shown in FIG. 3, the PGO stream was directly supplied to the combustion chamber without the pretreatment process (S2) (Comparative Examples 4 and 8), it was confirmed that the temperature satisfying both the kinematic viscosity and the flash point in the appropriate range described above did not exist.

Meanwhile, as shown in FIG. 1, even in the case in which the mixed oil stream in which the PGO stream and the PFO stream were mixed were produced by the pretreatment process (S2), in Comparative Examples 2, 3, 6, and 7 in which the flow rate ratio of the PGO stream and the PFO stream are out of the appropriate range of the present invention (0.01 to 0.3), it was confirmed that the temperature satisfying both the kinematic viscosity and the flash point in the appropriate ranges described above did not exist.

As such, in Comparative Examples 1 to 8 which does not satisfy the kinematic viscosity and the flash point in the appropriate ranges, it was confirmed that the process operating conditions for use as the raw material of the gasification process (S3) were not satisfied. Specifically, when the mixed oil stream is supplied to the combustion chamber at the temperature which does not satisfy any one of the kinematic viscosity and the flash point in the appropriate ranges, or a differential pressure in the combustion chamber is raised or atomization is not performed well to deteriorate combustion performance, an explosion risk is increased due to excessive oxygen, or flame may occur in the burner before a combustion reaction occurs, and an explosion risk is present by a backfire phenomenon of flame in the combustion chamber and refractories in the combustion chamber may be damaged.

The invention claimed is:

1. A method for preparing synthesis gas, the method comprising:
   mixing a pyrolysis fuel oil (PFO) stream including a PFO and a pyrolysis gas oil (PGO) stream including a PGO discharged from a naphtha cracking center (NCC) process to produce a mixed oil stream (S10); and
   supplying the mixed oil stream to a combustion chamber for a gasification process to obtain synthesis gas (S20),
   wherein a ratio of a flow rate of the PGO stream in the mixed oil stream to a flow rate of the mixed oil stream is 0.01 to 0.3.

2. The method for preparing synthesis gas of claim 1, wherein the ratio of the flow rate of the PGO stream in the mixed oil stream to the flow rate of the mixed oil stream is 0.05 to 0.2.

3. The method for preparing synthesis gas of claim 1, wherein the mixed oil stream has a kinematic viscosity at the time of supply to the combustion chamber of 300 cSt or less, and
   wherein the mixed oil has a flash point higher than a temperature at the time of supply to the combustion chamber by 25° C. or more.

4. The method for preparing synthesis gas of claim 3, wherein the mixed oil stream has the kinematic viscosity at the time of supply to the combustion chamber of 1 cSt to 300 cSt, and
   wherein the mixed oil has the flash point higher than the temperature at the time of supply to the combustion chamber by 25° C. to 150° C.

5. The method for preparing synthesis gas of claim 1, wherein the mixed oil stream passes through a heat exchanger before being supplied to the combustion chamber.

6. The method for preparing synthesis gas of claim 1, wherein the temperature of the mixed oil stream at the time of supply to the combustion chamber is 20° C. to 90° C.

7. The method for preparing synthesis gas of claim 1, wherein the PGO stream includes 70 wt % or more of hydrocarbons having 10 to 12 carbon atoms, and
   wherein the PFO stream includes 70 wt % or more of hydrocarbons having 13 or more carbon atoms.

8. The method for preparing synthesis gas of claim 1, wherein the PGO stream has a kinematic viscosity at 40° C. of 1 to 200 cSt, and
   wherein the PFO stream has a kinematic viscosity at 40° C. of 400 to 100,000 cSt.

9. The method for preparing synthesis gas of claim 1, wherein the PGO stream has a flash point of 10 to 50° C., and
   wherein the PFO stream has a flash point of 70 to 200° C.

10. The method for preparing synthesis gas of claim 1, wherein the PGO stream is a lower discharge stream discharged from a lower portion of a first stripper after supplying a side discharge stream discharged from a side portion of a gasoline fractionator of the naphtha cracking center (NCC) process to the first stripper, and
    wherein the PFO stream is a lower discharge stream discharged from a lower portion of a second stripper after supplying a lower discharge stream discharged from a lower portion of the gasoline fractionator of the naphtha cracking center (NCC) process to the second stripper.

11. The method for preparing synthesis gas of claim 10, wherein the lower discharge stream from the gasoline fractionator is discharged from a stage at 90% or more relative to the total number of stages of the gasoline fractionator, and
    wherein the side discharge stream from the gasoline fractionator is discharged from a stage at 10% to 70% relative to the total number of stages of the gasoline fractionator.

12. The method for preparing synthesis gas of claim 1, further comprising: burning the mixed oil stream supplied to the combustion chamber at a temperature of 700° C. or higher (S30).

13. The method for preparing synthesis gas of claim 1, wherein in the step S20, the mixed oil stream is supplied to the combustion chamber together with a gasifying agent.

14. The method for preparing synthesis gas of claim 13, wherein the gasifying agent includes one or more selected from the group consisting of oxygen, water, and air.

15. The method for preparing synthesis gas of claim 1, wherein the synthesis gas includes carbon monoxide and hydrogen.

* * * * *